United States Patent
Jackson et al.

(10) Patent No.: US 6,883,162 B2
(45) Date of Patent: Apr. 19, 2005

(54) ANNOTATIONS FOR TRANSACTION TRACING

(75) Inventors: Christopher J. Jackson, Westford, MA (US); Robert C. Zak, Jr., Bolton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 676 days.

(21) Appl. No.: 09/876,269

(22) Filed: Jun. 6, 2001

(65) Prior Publication Data

US 2002/0188831 A1 Dec. 12, 2002

(51) Int. Cl.⁷ ................................................ G06F 9/44
(52) U.S. Cl. ........................ 717/124; 717/124; 717/129
(58) Field of Search ................. 717/124, 126, 717/127, 128, 129, 131, 136, 151

(56) References Cited

U.S. PATENT DOCUMENTS

| | | | | |
|---|---|---|---|---|
| 5,265,254 A | * | 11/1993 | Blasciak et al. | 717/130 |
| 5,404,504 A | | 4/1995 | Byers et al. | |
| 5,450,586 A | * | 9/1995 | Kuzara et al. | 717/124 |
| 5,740,355 A | | 4/1998 | Watanabe et al. | |
| 5,970,246 A | * | 10/1999 | Moughani et al. | 717/128 |
| 6,226,786 B1 | * | 5/2001 | Hickman et al. | 717/124 |
| 6,343,371 B1 | * | 1/2002 | Flanagan et al. | 717/124 |
| 6,370,684 B1 | * | 4/2002 | De Pauw et al. | 717/124 |
| 6,434,741 B1 | * | 8/2002 | Mirani et al. | 717/124 |
| 6,701,519 B1 | * | 3/2004 | Cowan | 717/130 |
| 6,785,883 B1 | * | 8/2004 | Slomak | 717/128 |
| 6,807,583 B1 | * | 10/2004 | Hrischuk et al. | 719/318 |

OTHER PUBLICATIONS

Beltrame et al., Modeling assembly instruction timing in superscalar architecture, ACM ISSS, Oct. 2002, pp 132–137.*

Kaplan, Collecting whole system reference trace of multi-programming and multithreaded workloads, ACM WOSP, Jan. 2004, pp 228–237.*

Colcombet et al., "Enforcing trace properties by program transformation", ACM POPL, 2000, pp 54–66.*

* cited by examiner

Primary Examiner—Anil Khatri
(74) Attorney, Agent, or Firm—Meyertons Hood Kivlin Kowert & Goetzel, P.C.; Rory D. Rankin

(57) ABSTRACT

A method and mechanism for annotating a transaction stream. A processing unit is configured to generate annotation transactions which are inserted into a transaction stream. The transaction stream, including the annotations, are subsequently observed by a trace unit for debug or other analysis. In one embodiment, a processing unit includes a trace address register and an annotation enable bit. The trace address register is configured to store an address corresponding to a trace unit and the enable bit is configured to indicate whether annotation transactions are to be generated. Annotation instructions are added to operating system or user code at locations where annotations are desired. In one embodiment, annotation transactions correspond to transaction types which are not unique to annotation transactions. In one embodiment, an annotation instruction includes a reference to the trace address register which contains the address of the trace unit. Upon detecting the annotation instruction, and detecting annotations are enabled, the processing unit generates an annotation transaction addressed to the trace unit. In one embodiment, annotation transactions may be used to indicate context switches, processor mode changes, timestamps, or address translation information.

52 Claims, 10 Drawing Sheets

/— 580

| Time 582 | Event 584 | Information 586 |
|---|---|---|
| 0 | Annotation: Context Switch | OldPID:365<br>NewPID:200 |
| ⋮ | ⋮ | ⋮ |
| 10 | Processor Memory Reference | VA:2300 |
| 20 | Annotation: TLB Miss | VA:2300<br>PA:320 |
| 30 | Memory Read | PA:320 |
| ⋮ | ⋮ | ⋮ |
| 600 | Annotation: Context Switch | OldPID:200<br>NewPID:4732 |
| 852 | Annotation: Context Switch | OldPID:4732<br>NewPID:200 |
| 1018 | Processor Memory Reference | VA:2300 |
| 1028 | Annotation: TLB Miss | VA:2300<br>PA:320 |

Fig. 5B

ANNOTATIONS FOR TRANSACTION TRACING

BACKGROUND OF THE INVENTION

1. Field of the Invention

This invention is related to the field of computing systems, and more particularly, to the analysis and debug of digital systems.

2. Description of the Related Art

One of the more useful tools used in the analysis of computer systems is that of transaction tracing. Transaction tracing is the recording or observing of transactions which occur within a computer system in order to analyze the behavior of the computer system. Typically, transactions occurring on the computer system's memory or I/O bus are recorded for a period of time and subsequently analyzed in order to gain insight into the behavior of the system and the software executing on it.

FIG. 1 illustrates one embodiment of a system in which transaction tracing may be used. FIG. 1 shows a computer system 100 including processors 102A–102B, memories 104A–104B, I/O unit 106, and tracing unit 108 coupled to a bus 110. Elements referred to herein with a particular reference number followed by a letter will be collectively referred to by the reference number alone. For example, processors 102A–102B will be collectively referred to as processors 102. Whenever either processor 102A or 102B wants to access data contained in either memory 104, or perhaps in the other processor's cache, or wants to perform an I/O operation via the I/O unit 106, it issues a transaction on bus 110. The transaction on the bus 110 may then be observed by the tracing unit 108, which may record information pertinent to the transaction. Examples of pertinent information include the physical memory address used in the transaction, the data requested, or the time the transaction was issued. At a later time, the transactions recorded by the tracing unit can be retrieved and analyzed. It should be noted that while FIG. 1 illustrates tracing unit 108 as a standalone device, alternative embodiments may include tracing unit 108 as an integrated component of other devices or components.

Transaction tracing in non-bus based systems may be used as well. For example, a broadcast oriented network may utilize a transaction tracing unit to observe transaction data. Similarly, a system based on a switched interconnect could also incorporate a tracing unit. In the case of a switched interconnect, the tracing unit may be incorporated into the switch, or the switch may be programmed to send copies of all transactions to the tracing unit. Many different uses of transaction tracing are possible and are contemplated.

Transaction tracing may be used in a number of ways to assist in the debug and analysis of computing systems. First, tracing may be used to find faults in either the hardware or software of a system. For instance, if the I/O component of a system appears to be behaving incorrectly, it might be useful to trace the bus transactions corresponding to the incorrect behavior. By observing the relationship between the transactions appearing on the bus, and the behavior of the I/O unit, you may be able to isolate whether the I/O unit is behaving incorrectly or whether the software driving it is operating incorrectly.

Another way in which transaction tracing may be used is to analyze the performance of a system. For example, analysis of a trace may show that cache capacity misses were occurring and may be stopped by caches of a particular size. Analysis of a trace may reveal that data being used by different processors is located within the same cache line, leading to contention for that resource. In systems with non-uniform memory latency, analysis may determine what portion of data being used by a processor is coming from its local memory. Further, depending on a system's cache organization, analysis may reveal that two frequently accessed data items may map to the same cache location which may lead to unneeded bus transactions and reduced performance.

While transaction tracing can be extremely useful in system analysis and debug, it is not without its shortcomings. One problem with transaction tracing is that it observes and records the physical addresses of accessed data items. However, in most modern systems, applications deal with virtual addresses. Consequently, identifying the physical addresses of transactions may not be particularly useful to a developer trying to solve a problem with an application. Another problem with transaction tracing is that it has no visibility into which application or process is responsible for the transactions it is monitoring. Before an application developer can begin debugging an application, he must know which application at fault. Yet another problem with transaction tracing involves the vast quantity of data which may be generated by a system trace.

In view of the above described problems, a method and mechanism for facilitating system analysis and debug is desired.

SUMMARY OF THE INVENTION

A method and mechanism are contemplated in which annotations are inserted into a transaction stream to indicate certain events or conditions. Generally speaking, a processing unit is configured to generate annotation transactions which are inserted into a transaction stream. In one embodiment, a processing unit includes a trace address register and an annotation enable bit. The trace address register contains an address corresponding to a trace unit and the enable bit indicates whether or not annotation transactions are to be generated. Annotation instructions are added to operating system or user code at locations where annotations are desired. In one embodiment, annotation instructions correspond to transaction types which are not unique to annotation transactions. In such an embodiment, an annotation instruction references the trace address register which contains the address of the trace unit. Upon detecting the annotation instruction, and detecting annotations are enabled, the processing unit generates an annotation transaction. In one embodiment, annotation transactions may be used to indicate context switches, mode changes, timestamps, or virtual address information. By analyzing annotations in a data stream, enhanced debug and performance analysis may be accomplished.

BRIEF DESCRIPTION OF THE DRAWINGS

Other objects and advantages of the invention will become apparent upon reading the following detailed description and upon reference to the accompanying drawings in which:

FIG. 5B illustrates one embodiment of a collection of annotation information.

Figure 1:
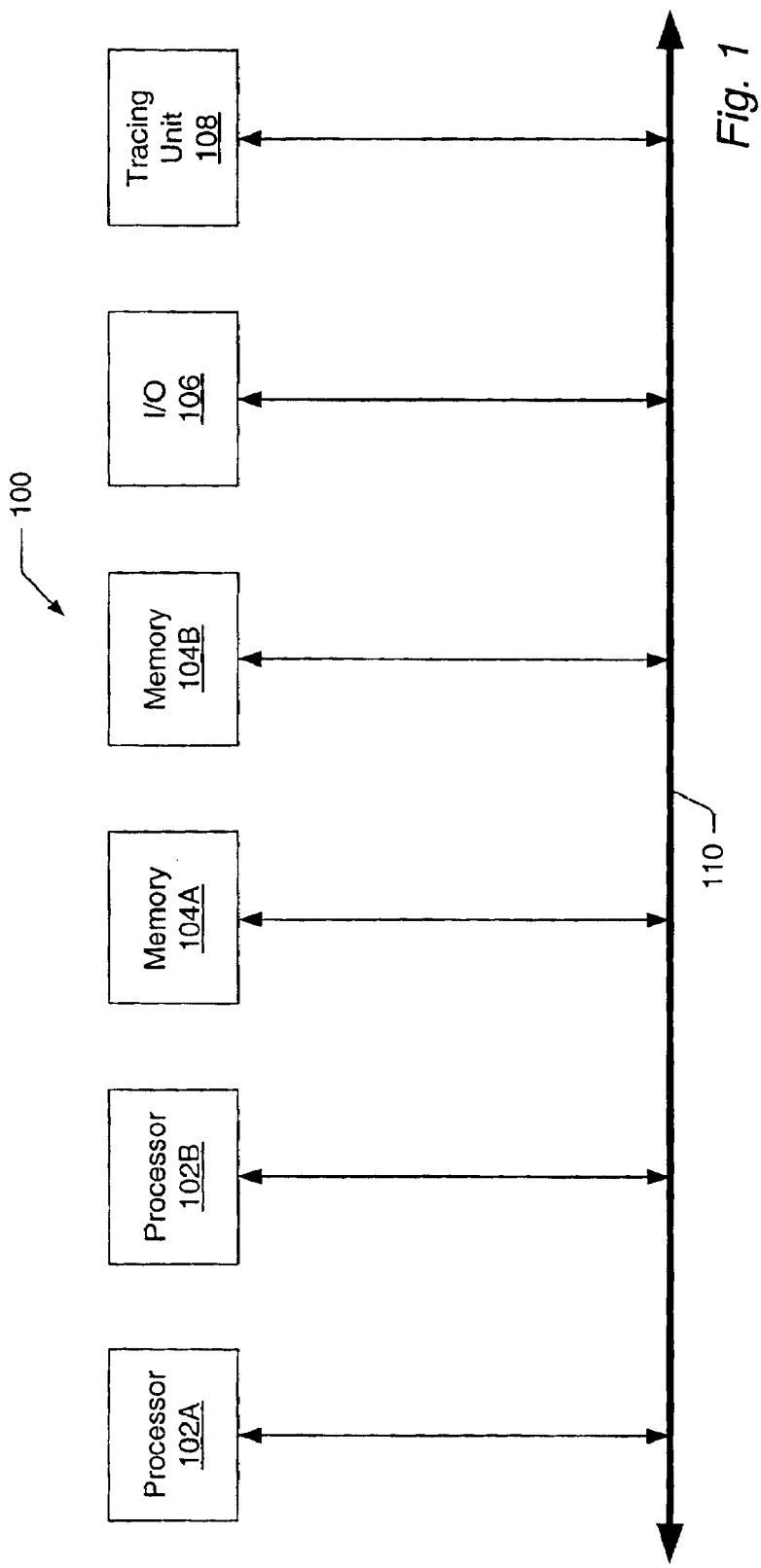
FIG. 1 is a diagram of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview

In order to address the problems discussed above, a method and mechanism utilizing "transaction annotations" is described. Generally speaking, transaction annotations are additional transactions which mark places in the traced transaction stream. Their purpose is to denote some state change of interest which may be used during analysis of the traced stream. In one embodiment, these transaction annotations may be utilized by an analysis program to build a current state table during analysis of the captured data. For example, by using an annotation which indicates a CPU has switched to interrupt mode, all subsequent transactions for that CPU, until the next context switch annotation, are known to have been generated by the interrupt handling code. Having such knowledge may greatly assist in the analysis process. Various embodiments and uses of transaction annotations are possible and are contemplated. Some examples of such uses are described in the following discussion.

Figure 2:
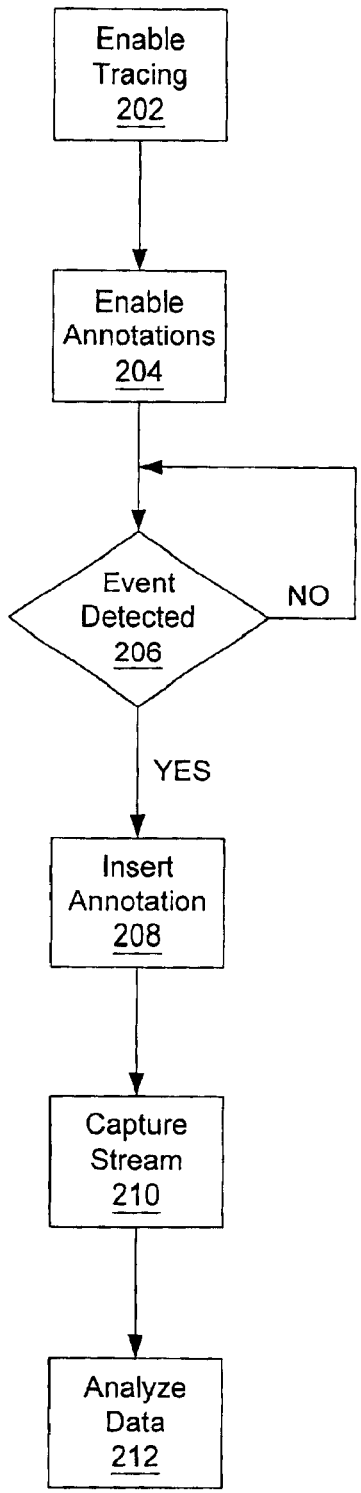
FIG. 2 illustrates one embodiment of a method for generating annotations.

FIG. 2 illustrates an overview of a method in which annotation transactions may be used. As used herein, an "annotation transaction" is an additional transaction added to the transaction stream generated during ordinary system operation and provides some information about the system operation. Initially, a transaction tracing unit may be enabled (block 202) to observe and/or capture a particular transaction stream. For example a tracing unit may be coupled to a system bus. In addition, a mechanism for generating annotations is enabled (block 204). Upon detecting a particular event (decision block 206), an annotation is inserted (block 208) into the transaction stream. Subsequently, the transaction stream including the annotation is captured (block 210) and may be analyzed (block 212). In the following discussion, various embodiments of a method and mechanism for transaction annotations will be described.

One exemplary use of transaction annotations is for the purpose of determining whether transactions are generated by an application or the operating system kernel. In this case, an annotation may be used to mark a point in a transaction stream indicating processor switches between user mode and kernel/privileged mode. Such an approach may be extended to finer levels of granularity to indicate, for example, when a processor takes and executes interrupts. In a second example, in order to tie traced transactions to a particular executing application, annotations may be used to indicate when the operating system performs a context switch to a new process. Further, if desired, annotations may be used to indicate when user-level code performs some state change of interest. For example, a thread library which has been implemented as user library code could make thread switch annotations. A third example involves using annotations to derive virtual addresses for traced transactions. In this case, annotations may be used to indicate processor retrieval of virtual-to-physical translation information on translation look-aside buffer (TLB) misses. By correlating translation information annotations with those which indicate context switches, an analysis program may build a record of the virtual address space for each process and correlate it with the traced transactions. Further, in order to reduce the amount of traced data which is collected, annotations may be used to start and stop collection of trace data by a tracing unit. Finally, in order to correlate transaction streams from different devices on a system whose interconnect does not guarantee strong ordering, annotations including time stamps may be used. Subsequent analysis may use this information to determine which transactions preceded others. Further discussion on the particular uses of annotation transactions will be discussed below.

Annotation

A number of options exists for how transaction annotations may be realized. For example, a special bus transaction type may be utilized for annotations. With a special bus transaction, a tracing unit may readily identify such transactions. In one embodiment the special transaction type may itself indicate the type of data being conveyed. Further, other devices coupled to observe such special transactions may be configured to ignore them. While a special transaction type may include some benefits, supporting a special bus transaction type may also involve significant modifications to the system. A second option is to add extra annotation data to every bus transaction. For instance, additional fields may be added to transactions to indicate the current executing process and processor mode. However, such an option leads to a significant increase in overhead for each transaction. In an alternative embodiment, a transaction annotation is represented by an ordinary bus transaction which is directed to a tracing unit. For example, in one embodiment, an ordinary store transaction may be used. By utilizing ordinary bus transactions, few modifications of the base system are required. Further, utilizing ordinary bus transactions is more efficient than adding data to every transaction as in the second option above.

Generating Annotations

Generation of transaction annotations may be accomplished by hardware, software, or a combination. In some cases, it may be appropriate for annotations to be automatically generated by a processor for those events which are known to the processor. For instance, a processor may detect changes from user mode to kernel/privileged mode. In response to detecting the mode change, the processor could generate an annotation indicating such a change. Similarly, when a processor fills its TLB with a hardware walk of the page tables, an annotation may be generated indicating such an event.

Software generation of transaction annotations may be appropriate for events which are not known to the processor. For example, in many processors a context switch is done via ordinary instructions which save and restore registers, without the processor executing any special instructions. In such a case, instructions which would generate appropriate annotations may be added to the context switch code. Further, in some cases software may be able to generate annotations which could have been done by the processor. For example, while the processor may be able to note a change between user and kernel/privileged mode, instructions added to the trap handling routines could be used to do so as well.

Annotations generated by software may be done in a variety of ways. For example, in embodiments where the annotation is a special bus transaction or extra data added to each transaction, the processor would need to support special instructions to generate these annotations. Alternatively, if the annotation is an ordinary bus transaction, software may use an ordinary instruction to generate the transaction annotation. However, a special instruction may be used here as well. Utilizing a special instruction may relieve the software of the task of keeping track of whether the annotations are wanted and where they should be directed.

Finally, it may be desired that devices other than processors generate transaction annotations. For instance, an I/O unit may receive requests that include the process or thread ID of the requesting process, in response to such requests the I/O unit may include annotations to indicate on whose behalf it is accessing memory.

Enabling Annotations and Timing

A number of approaches may be utilized for determining if and when transaction annotations are to be generated. For example, a system could be configured to always generate annotations. However, such an approach would generate extra bus activity even when the system is not being traced. Further, using such an approach may require using the special transaction type or augmented transaction approach. Otherwise, regular transactions directed to a non-existent tracing device may cause errors.

In an embodiment using purely software generated annotations, one may rely on conditionally executed code to decide whether to do annotations or not. However, software would typically need to use general purpose register space, or memory, to store annotation related data. For example, the software may store information which indicates whether transaction annotations are currently being generated and the address to which transaction annotations are being written. Use of existing resources in this manner may result in decreased performance.

As mentioned above, in one embodiment a special annotation-generation instruction may be utilized. For example, an ordinary store instruction may be used which is directed to a specially configured address space. Further, in one embodiment, the processor state is augmented with an enable bit to indicate whether transaction annotations are to be generated. Also, a destination register in the processor may be configured to hold the address to which transaction annotations are directed. In one embodiment, both the enable bit and the destination register in the processor are configurable in the same manner as other registers in the processor. Such configuration may be privileged or unprivileged.

Annotation Generation Instructions

Figure 3A:
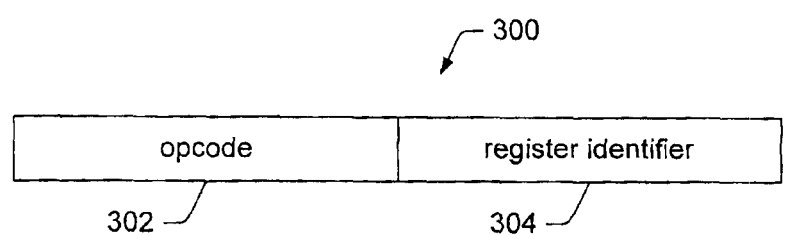
FIG. 3A illustrates one embodiment of an annotation instruction format.
Figure 3B:
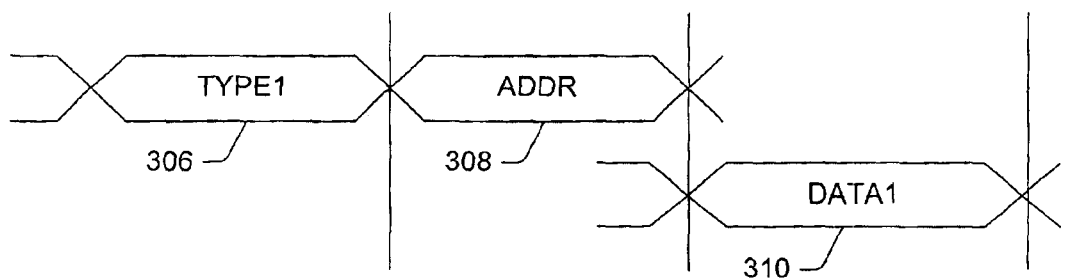
FIG. 3B illustrates one embodiment of annotation transactions.

In one embodiment, different annotation generation instructions, or "annotation instructions", may be used for different purposes. For example, one instruction may generate an annotation including a time stamp. A second instruction may be used which provides an indication of a mode change from user to kernel/privileged or vice-versa. A third instruction may be used to indicate a context switch. A fourth instruction may be used to indicate a TLB miss, and so on. FIGS. 3A–3B illustrate one embodiment of how annotation generation instructions may be used. FIG. 3A illustrates an exemplary embodiment of an annotation instruction format 300 and FIG. 3B illustrates one embodiment of transactions which may be generated by an annotation generation instruction. As used herein, an annotation instruction corresponds to an instruction whose purpose is to provide information for use in analyzing system operation.

Included in the exemplary instruction format 300, are an opcode 302 and a register identifier 304. The opcode 302 may represent a special instruction opcode corresponding to an annotation generation instruction which indicates a mode switch by the processor. The register identifier 304, may identify a register containing the address of a trace unit to which the annotation transaction is directed. In executing the instruction 300, a processor may be configured to generate a transaction, such as a write transaction, to the address indicated by register identifier 304. For example, execution of the instruction 300 may generate an address transaction and data transaction. In the exemplary embodiment of FIG. 3B, an address transaction including a transaction type 306 and address 308 may be generated. Subsequently, store data 310 may be conveyed to the indicated address 308. In one embodiment, the transaction type 306 provides an indication as to the content of the data 310. For example, if a special instruction is used, transaction type 306 may correspond to a "time stamp" transaction type. Upon detecting this special type, a trace unit may determine that the corresponding data 310 represents a time stamp. Alternatively, in one embodiment the transaction type 306 may represent an ordinary transaction type, such as a store. Where the transaction type represents an ordinary type, the data 310 may include an indication as to the type of data included therein. For example, the payload of data 310 may include a number of bits encoded to indicate its type. Further, bits of the address 308 may also be used to provide data or other information to a trace unit. Those skilled in the art will recognize numerous possibilities exist for the format of annotation generation instructions and corresponding transactions.

In one embodiment, the address corresponding to the tracing unit may be configured as non-cacheable address space which is not snooped by other devices coupled to the bus. Further, an indication of the address space corresponding to the trace unit may be included as immediate data in the address transaction, or in a register 304 as discussed above. Advantageously, other devices need not expend resources snooping annotation transactions.

Annotation generation instructions may be utilized at low levels of system software, such as the operating system kernel, to higher application levels, such as by an application developer. In one embodiment, annotation generation instructions are included in the operating system code of a system. For example, annotation generation instructions may be added to trap handling software. Upon entering a trap handler an annotation transaction may be generated which indicates a processor mode switch to a supervisor, or other privileged operating mode. When the trap handler is exited, another annotation transaction may be generated indicating that event. Advantageously, a transaction stream captured subsequent to entering a privileged operating mode may be identified by the annotation transaction. In this manner, identifying whether transactions are generated by an application program or lower level system software may be determined.

Figure 4:
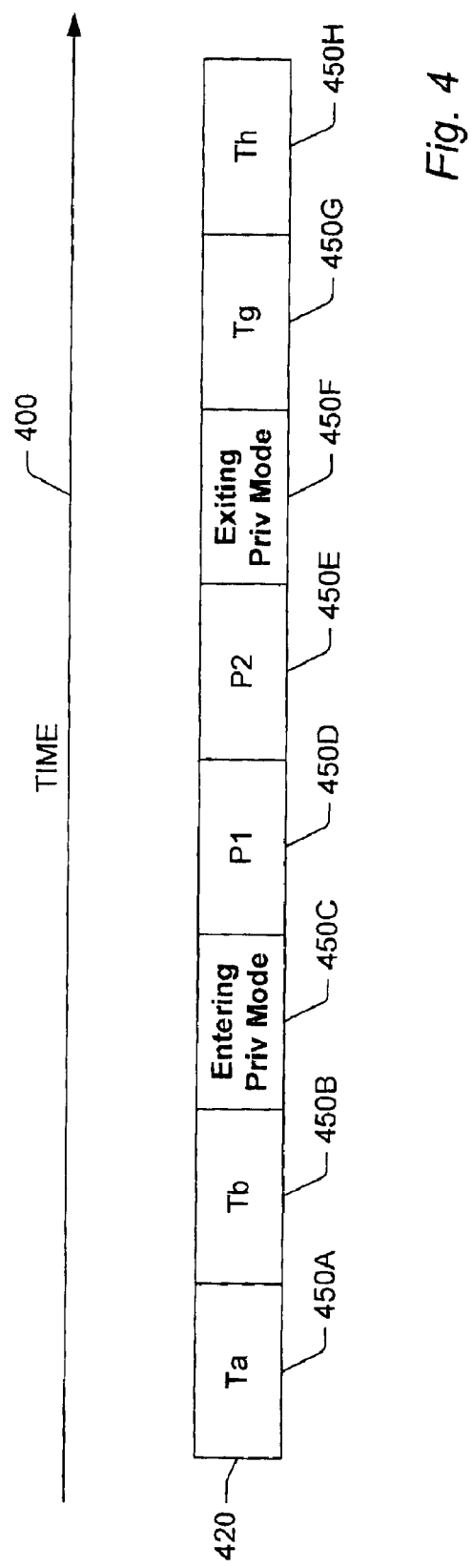
FIG. 4 illustrates one embodiment of mode change annotations.

FIG. 4 illustrates one embodiment of a transaction stream 420 including annotations indicating changes in operating modes. A timeline 400 indicates a progression of time from earlier, left, to later, right. Transaction stream 420 represents a stream of transactions 450A–450H which may be observed by a tracing unit. Transactions 450C and 450F represent annotation transactions. By utilizing annotation transactions 450C and 450F, a tracing unit may determine which transactions correspond to differing privilege levels or operating modes. In the example shown, transaction 450A may be observed by a tracing unit, followed by transaction 450B. Subsequent to transaction 450B, a change in mode or privilege level occurs and an annotation transaction 450C indicating that change is generated. Upon detecting the annotation transaction 450C, the tracing unit, or subsequent analysis of the trace, may determine that transactions 450D and 450E correspond to a different privilege level than that of transactions 450A and 450B. Upon exiting the privileged mode of execution, an annotation transaction 450F is generated which indicates the change of mode. Upon detecting this second annotation transaction 450F, the tracing unit may determine that transactions 450G and 450H correspond to a different mode or privilege level than transactions 450D and 450E. Advantageously, transactions corresponding to different modes or privilege levels may be distinguished from one another.

The above idea may be extended by adding annotation generation instructions to interrupt handling software. Consequently, by generating annotation transactions to identify entry and exit from an interrupt routine, captured data and transactions may be further identified. Hence, utilizing annotation transactions in conjunction with interrupts may enable distinguishing between an application process and an interrupt handling process. However, the ability to distinguish user applications and processes operating at the same privilege level is desirable as well. For example, a tracing unit which is monitoring a bus may not be able to distinguish between transactions generated by an application prior to a context switch and those generated by an application after a context switch. Consequently, being able to identify these types of context switches may be extremely useful in analyzing captured data.

Typically, an operating system may include a process scheduler which controls which process is executing at any given time. When the operating system determines that a currently executing process has run for a maximum allowable time slice, the operating system generates an interrupt to initiate a process or task switch. In response to the interrupt, the processor saves state information corresponding to the current process and begins execution of the new process. Execution of the new process may include loading the previously saved state of the new process. This saving and loading of states may be referred to as a context switch. By using annotation transactions in conjunction with these interrupts, context switches may be identified and transactions corresponding to different applications or processes may be distinguished from one another. This method may be extended to individual threads as well. By annotating switches among threads of execution, a tracing unit may distinguish transactions corresponding to one thread from another. In one embodiment, the generated annotation may include the ID of the thread prior to and after the switch.

Figure 5:
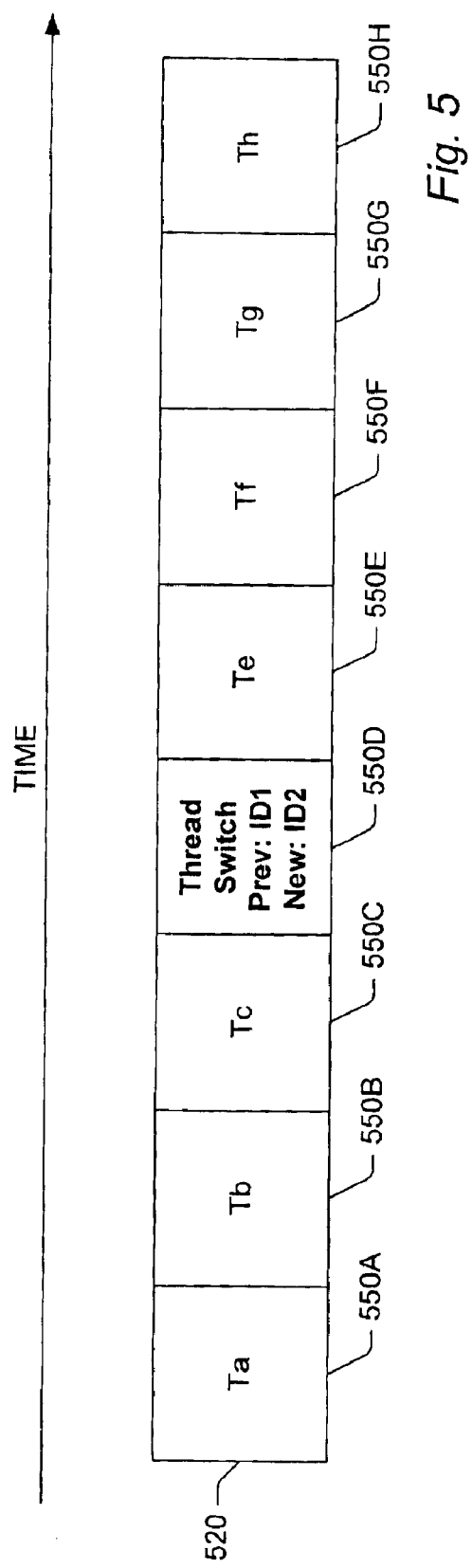
FIG. 5 illustrates one embodiment of a thread switch annotation.

FIG. 5 illustrates one example of how thread related annotations may be used. Included in FIG. 5 is a transaction stream 520, which includes transactions 550A–550H. Transaction 550D is an annotation transaction that indicates a thread switch. Included in the annotation 550D is an ID of the interrupted thread, ID1, and an ID of the new thread, ID2. A tracing unit observing transaction stream 520 may detect the annotation 550D and determine that transactions 550E–550H correspond to a thread, ID2, which is different from the thread which generated transactions 550A–550C. In an embodiment where all thread switches are annotated, a tracing unit may also determine that transactions 550A–550C correspond to the thread identified by ID1.

Virtual Addresses

As previously discussed, it may be desirable to know the virtual addresses corresponding to transactions which are observed and captured. More generally, one may desire to know the virtual address space corresponding to a particular process. However, addresses observed by a tracing unit on an address bus typically are physical address. One method which may be used to determine corresponding virtual addresses involves utilizing annotation transactions on TLB misses. In one embodiment, when a TLB miss occurs, an annotation transaction is generated which includes both the virtual address and the corresponding physical address.

While various memory management configurations and schemes are known in the art, a TLB miss typically results in an access to translation information (e.g., a translation table or page table) stored within memory. Handling of TLB misses may include hardware, software or a combination the two. In one embodiment, a TLB miss results in a trap which initiates a trap handler. By adding transaction annotation generating instructions to the trap handling code, annotation transactions may be generated which include translation information.

Figure 5A:
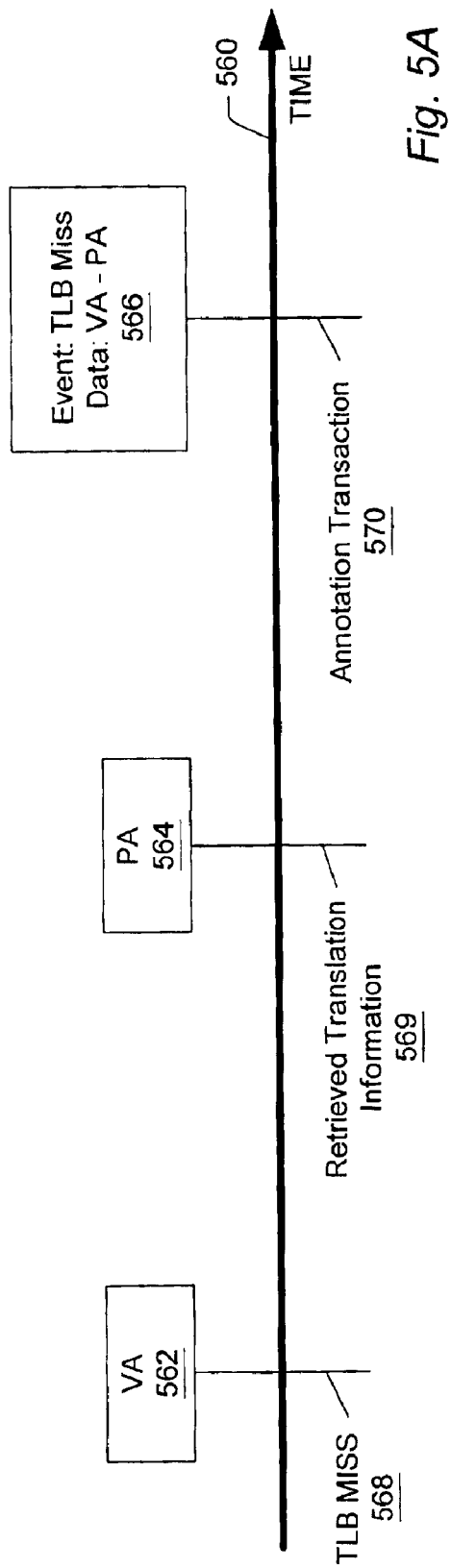
FIG. 5A illustrates one embodiment of an address translation annotation.

FIG. 5A illustrates one embodiment of a sequence of events wherein an annotation transaction including translation information is generated. A timeline 560 indicates a series of events from earlier in time (on the left) to later in time (on the right). At a first point in time 568, a processor presents a virtual address 562 to a memory management subsystem and a TLB miss is detected. Subsequently, at a later point in time 569, translation information 564 corresponding to the virtual address 562 is retrieved from memory. Translation information 564 includes information indicating the physical address corresponding to virtual address 562. Finally, at a third point in time 570 subsequent to receiving the retrieved information 564, the processor generates a transaction annotation 566 which includes information corresponding to the virtual and physical addresses. In the embodiment shown, the annotation transaction 566 includes information describing the event as a TLB miss, and the corresponding virtual and physical addresses.

By correlating the information obtained from these TLB miss annotation transactions with that of other transactions, further details about the system operation may be determined as well. For example, by correlating TLB miss annotation transactions with those of context switches, the virtual address space for executing processes may be determined. For example, an annotation indicating a context switch is observed by a tracing unit. Immediately thereafter, an annotation indicating a TLB miss is observed which includes the corresponding virtual and physical addresses. As this process in repeated during observation, a tracing unit or subsequent analysis may be able to correlate processes with both physical and virtual addresses. Advantageously, when analyzing a particular transaction stream, the virtual address space corresponding to those transactions may be identified.

FIG. 5B is an example of one embodiment illustrating collected annotation transaction data. FIG. 5B shows a table 580 including three columns. A first column 582 corresponds to the time at which an event occurred, the second column 584 indicates the event observed, and the third column 586 indicates information corresponding to the event or provided by an annotation transaction. At time 0, an annotation transaction is observed which indicates a context switch occurred. In addition, the process identifiers (PID) of the processes involved in the context switch are identified. In the table 580 of FIG. 5B, the PID of the process being switched from is shown as OldPID, and the PID of the process being switched to is shown as NewPID. As shown at time 0, the process being switched from had a PID of 365 and the process being switched to had a PID of 200. At time 10, a processor memory reference is initiated to a virtual address (VA) of 2300. At time 20, a TLB miss is observed. Additional information 586 in the annotation transaction indicates the virtual address which missed in the TLB was 2300 and the physical address (PA) corresponding to the VA was 320. At time 30, a memory reference to a location with physical address 320 is observed. At time 600, a context switch is observed from the process with OldPID 200 to a process with NewPID 4732. At time 852, another context switch is observed from the process with OldPID 4732 to the process with NewPID 200. At time 1018, a processor memory reference to virtual address 2300 occurs. Subsequently, at time 1028, a TLB miss is observed with a virtual address of 2300 and corresponding physical address of 320.

While the example of FIG. 5B is relatively small, analysis may reveal certain patterns exhibited by the observed annotation transactions. For example, subsequent to a context switch to the process with NewPID 200 at times 0 and 852, a TLB miss was observed involving virtual address 2300 and corresponding physical address 320. Such a pattern may be observed to indicate that a virtual address space including virtual address 2300 corresponds to the physical address 320 and the process with PID 200. Consequently, when the memory read at time 30 to physical address 320 is observed, the virtual address 2300 may be inferred to correspond to that physical address. Additional captured data and analysis may serve to identify the virtual address spaces corresponding to the physical addresses utilized by other processes as well. Advantageously, by performing such an analysis, virtual addresses corresponding to observed physical addresses may be deduced which may result in enhanced debug and analysis of system performance.

Time Stamps

Figure 6:
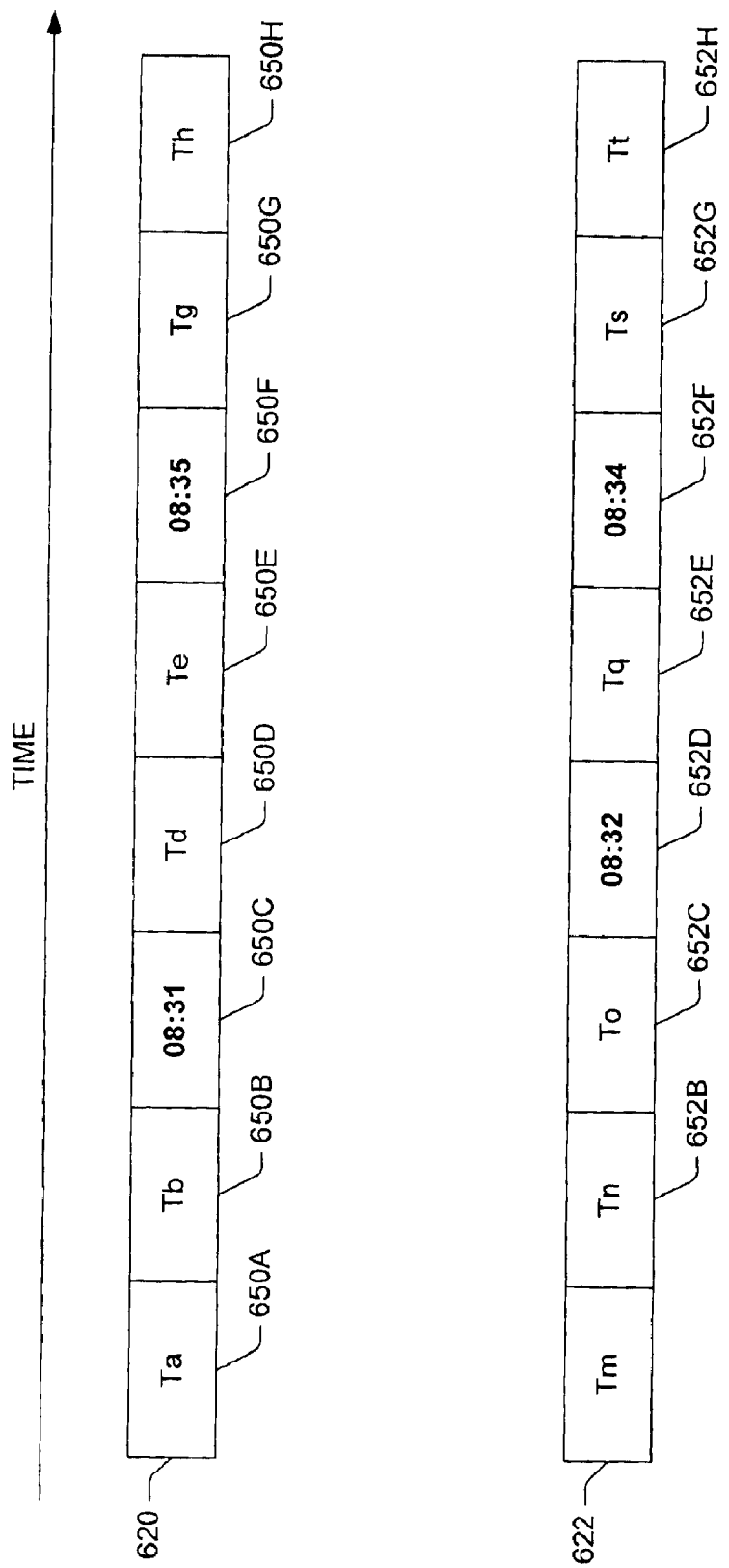
FIG. 6 illustrates one method for correlating transaction streams.

In some cases it may be desirable to trace multiple transaction streams in a system. Depending on the circumstances, it may or may not be possible to trace multiple transaction streams simultaneously. Further, whether the transaction streams are captured simultaneously or not, it may not be possible to determine whether a transaction in one stream preceded or followed in time a transaction in another stream. One method for permitting transactions to be correlated involves using time stamps in annotation transactions. FIG. 6 illustrates one embodiment in which time stamps may be used. Two transactions streams are shown, 620 and 622. Transactions stream 620 and 622 are observed separately from one another. In one embodiment, each of transaction streams 620 and 622 may represent streams which are observed concurrently by different trace units within a system. Alternatively, transaction streams 620 and 622 may represent streams which are observed by a single trace unit at different times.

In a first embodiment where transaction streams 620 and 622 are concurrently observed by separate trace units, a time stamp annotation transaction may be inserted into the transaction stream at particular times. Time stamp annotations may be generated periodically, or in response to some detected event. In the illustration of FIG. 6, transaction stream 620 includes transactions 650A–650H. Transactions 650C and 650F represent time stamp annotation transactions. In the embodiment shown, included in time stamp annotation transactions 650C and 650F is an indication of the time at which the annotation was generated. The time indicated may represent a system time or a time relative to some reference point in time, such as the beginning of a test. Similarly, transaction stream 622 includes transactions 652 which includes time stamp annotations 652D and 652F.

Because transaction streams 620 and 622 are separately observed, it may not be readily determined whether a particular transaction in one stream preceded a transaction in the other stream. This may be particularly true in a system which does not enforce strong ordering among transactions. Utilizing the time stamp annotations within the streams, a relationship between the transactions may be determined. For example, transaction 650C includes a time stamp indicating a time of 08:31 and transaction 650F includes a time stamp indicating a time of 08:35. Transaction 652D includes a time stamp indicating a time of 08:32 and transaction 652F includes a time stamp indicating a time of 08:34. Consequently, certain relationships among the transactions in the two streams may be determined. For example, because transactions 650A–650B are seen to occur prior to time 08:31, and transaction 652E is seen to occur subsequent to time 08:32, transactions 650A–650B are determined to have preceded transaction 652E. Advantageously, by determining the relationship between transactions in separate streams, a larger system behavior may be analyzed.

As mentioned above, one problem that may arise in tracing transactions is the large quantity of data which is collected. Frequently it is desired to observe a particular event or sequence of events, but there is no easy way to isolate collection of data specific to those events. Consequently, it may be necessary to trace a large number of transactions and collect a large amount of data in order to ensure the desired events are captured. In many cases this involves collecting a large amount of irrelevant data. In order to deal with problems like this, and others, an annotation transaction may be utilized which acts as a trigger to a tracing unit. In one embodiment, a start/stop annotation may be used to cause the trace unit to start and stop collection of data. These annotations may be inserted in code at particular points of interest, such as the entry of a particular routine, to begin collection of trace data corresponding the routine. Subsequently, upon exiting the routine, a start/stop annotation transaction may be used which causes the trace unit to stop collecting data.

In an alternative embodiment, a trace unit may be configured to start or stop collecting data upon detection of a particular transaction. For example, a trace unit may be configured to start collection of data in response to detecting a particular context switch annotation, time stamp annotation, or otherwise.

Figure 7:
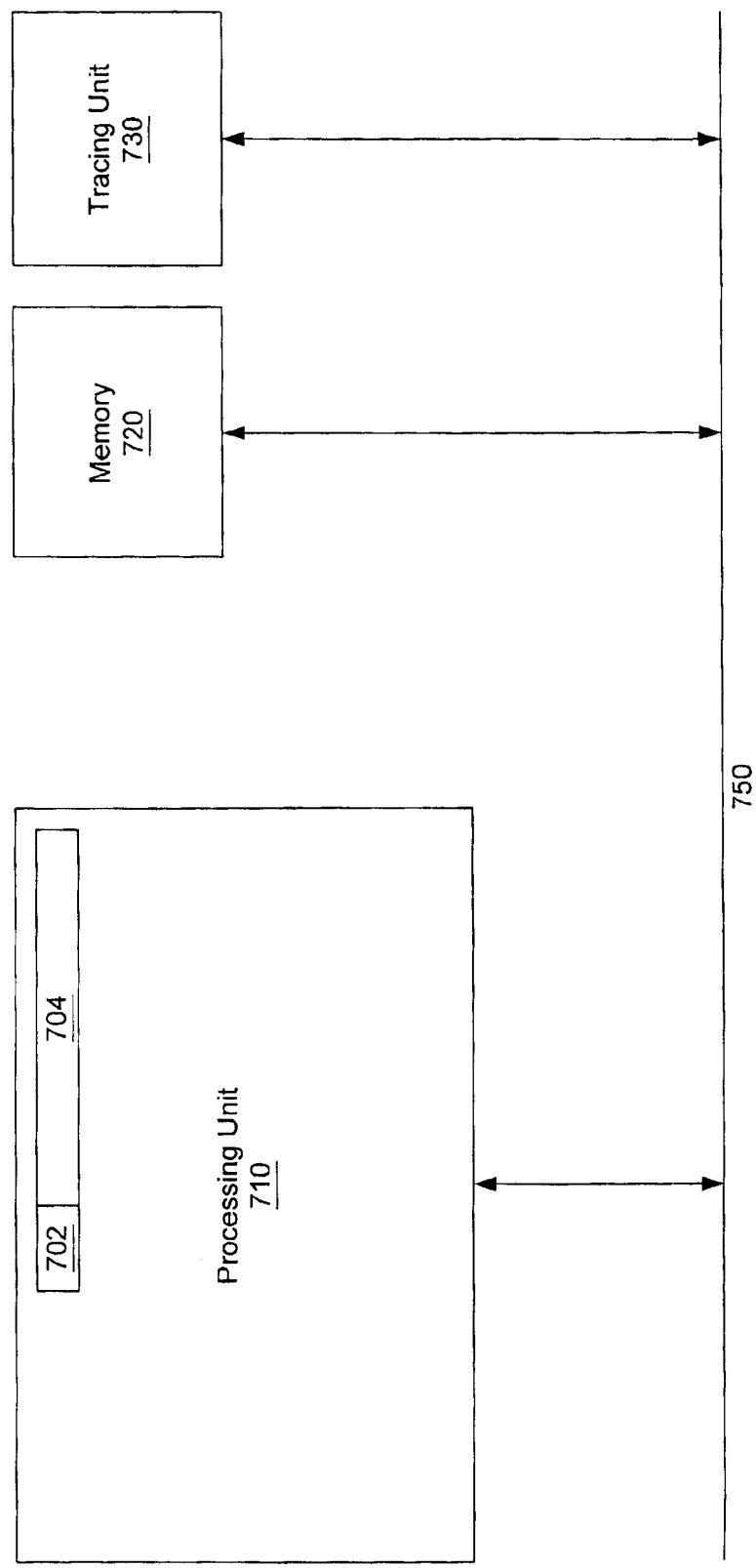
FIG. 7 is a block diagram of a computer system.

FIG. 7 illustrates one embodiment of a system including an annotation mechanism. Included in FIG. 7 are a processing unit 710, memory 720, and tracing unit 730. Each of processing unit 710, memory 720 and tracing unit 730 are coupled to an interconnect 750. Interconnect may be a bus based interconnect, switched network interconnect, or otherwise. Processing unit 710 includes a trace address register 704 and an enable bit 702. Trace address register 704 and enable bit 702 may, or may not, be part of the same physical memory structure. Trace address register 704 stores an address corresponding to the tracing unit 730. Enable bit 702 indicates whether or not transaction annotations are enabled.

Generally speaking, processing unit 710 generates transactions which are conveyed upon interconnect 750. Tracing unit 730 is configured to observe, and perhaps record, transactions occurring on interconnect 750. During execution, processing unit may encounter an annotation instruction. In one embodiment, as described above, the annotation instruction may be of a preexisting type of instruction, such as a store instruction. Upon detecting the annotation instruction, processing unit 710 may be configured to access a register identified in the annotation instruction which indicates the trace address register 704. Upon detecting that the annotation instruction references the trace address register 704, processing unit 710 may then be configured to access enable bit 702 in order determine whether annotations are enabled. In response to detecting annotations are enabled, processing unit 710 is configured to generate a transaction corresponding to the annotation instruction. Processing unit 710 utilizes the address stored in trace address register 704 to generate an annotation transaction addressed to tracing unit 730. However, if processing unit 710 detects annotations are not enabled, processing unit 710 may be configured to generate a no-op, or otherwise ignore the annotation instruction.

Figure 8:
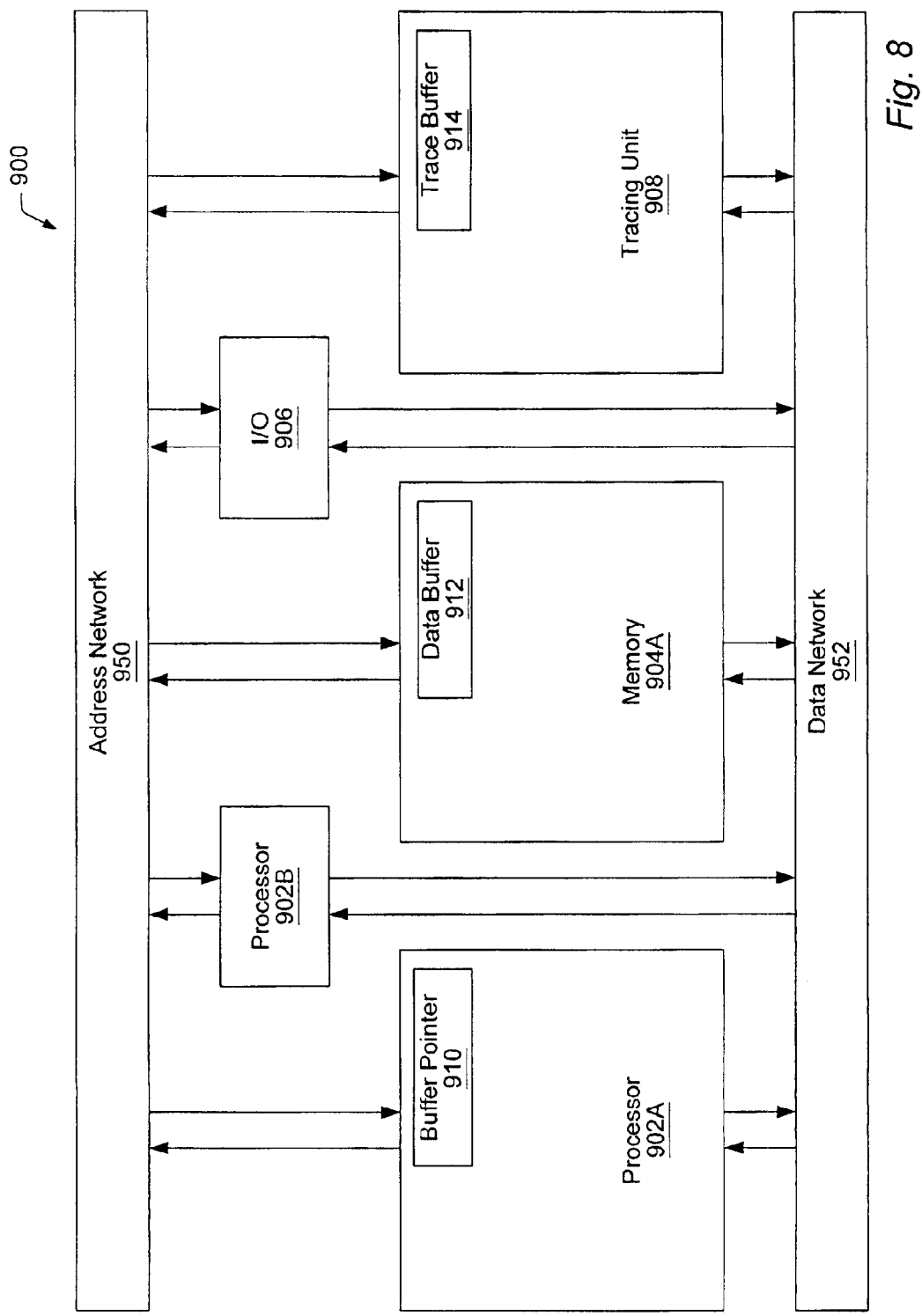
FIG. 8 illustrates one embodiment of a computer system.

FIG. 8 is a block diagram illustrating an alternative embodiment of a method and mechanism for generating transaction annotations. FIG. 8 includes processors 902, memory devices 904, I/O device 906 and tracing unit 908. Each of processors 902, memory devices 904, I/O device 906 and tracing unit 908 are coupled to an address network 950 and a data network 952. Address network is configured to convey address transactions and data network 952 is configured to convey data transactions.

In the embodiment shown in FIG. 8, tracing unit 908 is configured to trace address transactions and store corresponding information in a trace buffer 914. However, tracing unit 908 is not configured to trace data transactions corresponding to the traced address transactions. As described above, processor 902A may be configured to insert transaction annotations into a transaction stream. Such transaction annotations my include address transactions conveyed upon address network 950 and data transactions conveyed upon data network 952. However, rather than directing transaction annotations to tracing unit 908, processor 902A may be configured to direct transaction annotations to a dedicated region of system memory.

When a transaction annotation is generated by processor 902A, processor 902A directs the transaction annotation to a region of memory 912 dedicated to storage of trace data. In the embodiment shown, memory device 904A includes a dedicated data buffer 912 for storage of data corresponding to transaction annotations. Alternatively, memory device 904A may include a region of memory which has been allocated for the purpose of storing trace data. Other storage mechanisms are possible and are contemplated as well. Tracing unit 908 is configured to trace address transactions and may be configured to identify those transactions corresponding to the dedicated region of memory 912. Data corresponding to the transaction annotation generated by the processor 902 is stored in data buffer 912. In one embodiment, information stored by tracing unit 908 includes opcode and address information, while data buffer 912 stores opcode and data information. Subsequently, analysis may be performed and address transactions traced by tracing unit 908 may be correlated with the data stored in data buffer 912. Advantageously, implementation of tracing unit 908 may be simplified as compared to an embodiment wherein both address and data transactions are traced by the tracing unit.

In the embodiment shown in FIG. 8, processor 910 includes a buffer pointer 910 which is configured to store an address pointer to a memory location within data buffer 912. In one embodiment, buffer pointer 910 comprises a register. Processor 902A is configured to increment buffer pointer 910 subsequent to generating a transaction annotation. An alternative embodiment may increment buffer pointer 910 prior to generating a transaction annotation. In one embodiment, buffer pointer 910 is incremented with a size corresponding to the generated transaction annotation. For example, buffer pointer 910 may be incremented with a size indicated by the opcode and register identifier corresponding to the annotation generating instruction. To prevent buffer pointer 910 from being incremented to a location outside data buffer 912, buffer pointer 910 may be incremented modulo the size of data buffer 912. Such a method of incrementation results in buffer pointer 910 wrapping around from the end of data buffer 912 to the beginning. Because data may be overwritten when buffer pointer 910 wraps around, an alternative embodiment includes a data buffer 912 configured with a size which corresponds to the period of the trace. In this manner, a single trace will not exceed the size of the data buffer 912. In addition to buffer pointer 910, processor 902A may also include an annotation enable bit as described above.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as network and/or a wireless link. A carrier medium may also include storage media or memory media such as magnetic or optical media, e.g., disk or CD-ROM, volatile or non-volatile media such as RAM (e.g. SDRAM, RDRAM, SRAM, etc.), ROM, etc.

Numerous variations and modifications will become apparent to those skilled in the art once the above disclosure is fully appreciated. It is intended that the following claims be interpreted to embrace all such variations and modifications.

What is claimed is:

1. A method for generating annotation transactions, said method comprising:

adding an annotation instruction to a group of instructions;

detecting said annotation instruction; and generating an annotation transaction corresponding to said annotation instructions;

wherein said annotation transaction includes address translation information.

2. The method of claim 1, wherein said annotation transaction is directed to an address corresponding to a trace unit.

3. The method of claim 1, wherein said annotation transaction is directed to an address corresponding to a dedicated region in a memory device.

4. The method of claim 3, further comprising incrementing said address.

5. The method of claim 1, wherein said annotation instruction comprises an opcode and a register identification, wherein said register identification identifies a register containing an address corresponding to a trace unit.

6. The method of claim 1, wherein said annotation transaction is generated responsive to detecting annotation transactions are enabled, and wherein said method further comprises inhibiting generation of said annotation transaction in response to detecting annotation transactions are disabled.

7. The method of claim 1, further comprising generating an annotation transaction including information selected from the group consisting of:
- a timestamps;
- a context switch; and
- a mode change.

8. The method of claim 1, wherein said annotation transaction corresponds to a transaction type selected from the group consisting of: a special transaction type which is unique to annotation transactions; and a transaction type which is not used for only annotation transaction.

9. The method of claim 1, wherein said annotation transaction is generated in response to either a translation lookaside buffer miss or a hardware walk of page tables.

10. A device comprising:
- an interconnect configured to convey transactions; and
- a processing unit coupled to said interconnect, wherein said processing unit is configured to generate an annotation transaction on said interconnect, in response to detecting a first event;
- wherein said annotation transaction includes address translation information.

11. The device of claim 10, wherein said processing unit is configured to generate said annotation transaction in further response to detecting annotation transactions are enabled, and wherein said processing unit is configured to inhibit generation of said annotation transaction in response to detecting annotation transactions are disabled.

12. The device of claim 11, further comprising:
- an address register configured to store an address, wherein said address is used in generating said annotation transaction; and
- an annotation enable bit, wherein a first state of said bit indicates said annotations are enabled, and a second state of said bit indicates said annotation are disabled;
- wherein said processing unit is configured to access said address register in order to obtain said address, and wherein said processing unit is configured to access said enable bit in order to determine whether annotations are enabled or disabled.

13. The device of claim 12, wherein said annotation instruction comprises an opcode and a register identification, wherein said register identification identifies said address register.

14. The device of claim 12, wherein said address corresponds to a trace unit coupled to said interconnect.

15. The device of claim 12, wherein said address corresponds to a dedicated region in a memory device coupled to said interconnect.

16. The device of claim 15, wherein said processing unit is configured to increment said address.

17. The device of claim 10, wherein said first event is selected from the group consisting of:
- occurrence of an annotation instruction;
- the elapse of a fixed period of time;
- a context switch;
- a mode change;
- a translation look-aside buffer miss.

18. The device of claim 10, wherein said processing unit is further configured to generate an annotation transaction which includes information selected from the group consisting of: a timestamp, a context switch, and mode change.

19. The device of claim 10, wherein said annotation transaction corresponds to a transaction type selected from the group consisting of: a special transaction type which is unique to annotation transactions; and a transaction type which is not used for only annotation transactions.

20. The device of claim 10, wherein said annotation transaction is generated in response to either a translation lookaside buffer miss or a hardware walk of page tables.

21. A system comprising:
- an interconnect;
- a processing unit coupled to said interconnect, wherein said processing unit is configured to generate an annotation transaction on said interconnect in response to detecting a first event; and
- a trace unit coupled to said interconnect, wherein said trace unit is configured to observe said annotation transaction;
- wherein said annotation transaction includes address translation information.

22. The system of claim 21, wherein said processing unit is configured to generate said annotation transaction in further response to detecting annotation transactions are enabled, and wherein said processing unit is further configured to inhibit generation of said annotation transaction in response to detecting annotation transactions are disabled.

23. The system of claim 22, further comprising:
- an address register configured to store an address, wherein said address is used in generating said annotation transaction; and
- an annotation enable bit, wherein a first state of said bit indicates said annotations are enabled, and a second state of said bit indicates said annotation are disabled;
- wherein said processing unit is configured to access said address register in order to obtain said address, and wherein said processing unit is configured to access said enable bit in order to determine whether annotations are enabled or disabled.

24. The system of claim 23, wherein said annotation instruction comprises an opcode and a register identification, wherein said register identification identifies said address register.

25. The system of claim 23, wherein said address corresponds to a trace unit coupled to said interconnect.

26. The system of claim 23, further comprising a memory device coupled to said interconnect, wherein said address corresponds to a dedicated region in said memory device.

27. The system of claim 26, wherein said processing unit is configured to increment said address.

28. The system of claim 21, wherein said first event is selected from the group consisting of:
- occurrence of an annotation instruction;
- the elapse of a fixed period of time;
- a context switch; and
- a mode change.

29. The system of claim 21, wherein said processing unit is further configured to generate an annotation transaction which includes information selected from the group consisting of: a timestamp, a context switch, and mode change.

30. The system of claim 21, wherein said annotation transaction corresponds to a transaction type which is selected from the group consisting of: a special transaction type which is unique to annotation transactions; and a transaction type which is not used for only annotation transactions.

31. The system of claim 21, wherein said first event corresponds to either a translation lookaside buffer miss or a hardware walk of page tables.

32. The system of claim 21, wherein said trace unit is configured to observe address and data transactions corresponding to said annotation transaction.

33. The system of claim 21, wherein said trace unit is configured to observe only address transactions corresponding to said annotation transaction.

34. A method of analyzing a system, wherein said system includes an interconnect configured to convey transactions, said method comprising:

detecting an occurrence of a predetermined event in the system;

creating an annotation transaction corresponding to said detected event, wherein said annotation transaction includes address translation information; and conveying said annotation transaction via said interconnect.

35. The method of claim 34, wherein said annotation transaction is directed to an address corresponding to a trace unit.

36. The method of claim 34, wherein said annotation instruction comprises an opcode and a register identification, wherein said register identification identifies a register containing an address corresponding to a trace unit.

37. The method of claim 34, wherein said annotation transaction is directed to an address corresponding to a dedicated region in a memory device coupled to said interconnect.

38. The method of claim 34, wherein said annotation instruction comprises an opcode and a register identification, wherein said register identification identifies a register containing an address corresponding to a dedicated region of a memory device coupled to said interconnect.

39. The method of claim 38, further comprising incrementing said address.

40. The method of claim 39, wherein said region of memory comprises a predetermined size, and wherein said address is incremented modulo said predetermined size.

41. The method of claim 34, further comprising generating an annotation transaction which comprises information selected from the group consisting of:

a time stamp;

context switch information; and mode change information.

42. The method of claim 34, wherein said annotation transaction is created in response to detecting annotation transactions are enabled, and wherein said method further comprises inhibiting creation of said annotation transaction in response to detecting annotation transactions are disabled.

43. The method of claim 34, wherein said predetermined event is selected from the group consisting of:

the elapse of a fixed period of time;

a context switch;

a mode change;

a translation look-aside buffer miss.

44. A carrier medium comprising program instructions, wherein said program instructions are executable to:

detect a predetermined event in a computing system;

generate an annotation transaction, wherein said annotation transaction includes address translation information; and convey said annotation transaction via an interconnect.

45. The carrier medium of claim 44, wherein said program instructions are executable to generate said annotation transaction with an address corresponding to a trace unit coupled to said interconnect.

46. The carrier medium of claim 44, wherein said annotation instruction comprises an opcode and a register identification, wherein said register identification identifies a register containing an address corresponding to a trace unit.

47. The carrier medium of claim 44, wherein said program instructions are executable to generate said annotation transaction with an address corresponding to a dedicated region in a memory device coupled to said interconnect.

48. The carrier medium of claim 44, wherein said annotation instruction comprises an opcode and a register identification, wherein said register identification identifies a register containing an address corresponding to a dedicated region of a memory device coupled to said interconnect.

49. The carrier medium of claim 48, wherein said program instructions are further executable to increment said address.

50. The carrier medium of claim 49, wherein said region of memory comprises a predetermined size, and wherein said program instructions are executable to increment said address modulo said predetermined size.

51. The carrier medium of claim 44, wherein said program instructions are further executable to generate an annotation transaction which comprises at least one of:

a time stamp;

context switch information; and mode change information.

52. The carrier medium of claim 44, wherein said program instructions are executable to generate said annotation transaction in response to detecting annotation transactions are enabled, and wherein said program instructions are further executable to inhibit generation of said annotation transaction in response to detecting annotation transactions are disabled.

* * * * *

UNITED STATES PATENT AND TRADEMARK OFFICE
CERTIFICATE OF CORRECTION

PATENT NO. : 6,883,162 B2 Page 1 of 1
DATED : April 19, 2005
INVENTOR(S) : Jackson et al.

It is certified that error appears in the above-identified patent and that said Letters Patent is hereby corrected as shown below:

Column 12,
Line 50, please replace "instructions;" with -- instruction; --.

Column 13,
Line 4, please replace "timestamps;" with -- timestamp; --.

Signed and Sealed this

Sixth Day of December, 2005

JON W. DUDAS
*Director of the United States Patent and Trademark Office*